United States Patent
Takezaki (10) Patent No.: US 11,022,064 B2
(45) Date of Patent: Jun. 1, 2021

(54) ENGINE

(71) Applicant: SUBARU CORPORATION, Tokyo (JP)

(72) Inventor: Takayuki Takezaki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/912,305

(22) Filed: Jun. 25, 2020

(65) Prior Publication Data

US 2021/0025350 A1    Jan. 28, 2021

(30) Foreign Application Priority Data

Jul. 22, 2019  (JP) .............................. JP2019-134230

(51) Int. Cl.
   *F02F 1/24*     (2006.01)
   *F02F 7/00*     (2006.01)
   *F02F 1/42*     (2006.01)

(52) U.S. Cl.
   CPC ............ *F02F 1/242* (2013.01); *F02F 7/0021* (2013.01); *F02F 1/4285* (2013.01)

(58) Field of Classification Search
   CPC .. F02F 1/24; F02F 1/242; F02F 7/0021; F02F 1/4285; F02F 3/12; F02F 3/14; F02F 3/24; F02F 3/26; F02F 3/28; F02F 3/285
   See application file for complete search history.

(56) References Cited

U.S. PATENT DOCUMENTS

| | | | | |
|---|---|---|---|---|
| 3,195,519 | A | * | 7/1965 | Bishop ................. F02B 23/104 123/275 |
| 3,270,721 | A | * | 9/1966 | Hideg .................. F02B 23/105 123/306 |
| 5,209,200 | A | * | 5/1993 | Ahern ................... F02B 23/101 123/276 |
| 5,617,823 | A | * | 4/1997 | Gray, Jr. ............... F02B 23/101 123/254 |
| 6,220,215 | B1 | * | 4/2001 | Morimoto ............ F02F 1/4214 123/193.6 |
| 10,465,629 | B2 | * | 11/2019 | Blom .................. F02B 23/0678 |

FOREIGN PATENT DOCUMENTS

| | | | | |
|---|---|---|---|---|
| JP | 04370319 | A | * 12/1992 | ............ F02B 23/104 |
| JP | 6-93861 | A | 4/1994 | |

* cited by examiner

*Primary Examiner* — Hung Q Nguyen
(74) *Attorney, Agent, or Firm* — Troutman Pepper Hamilton Sanders LLP (57) ABSTRACT

An engine includes a cylinder head, an ignition plug disposed in the cylinder head, a head partition wall disposed on the cylinder head to surround a periphery of the ignition plug, an injector disposed in the cylinder head and having an injection hole exposed outside the head partition wall, a cylinder block coupled to the cylinder head, a cylinder formed in the cylinder block, a piston disposed in the cylinder, and a piston partition wall disposed on a crown surface of the piston to face the head partition wall in a sliding direction of the piston. The height of the piston partition wall from the crown surface on the side closer to the injector is less than the height of the piston partition wall from the crown surface on the side farther from the injector.

8 Claims, 7 Drawing Sheets

ENGINE

CROSS-REFERENCE TO RELATED APPLICATIONS

The present application claims priority from Japanese Patent Application No. 2019-134230 filed on Jul. 22, 2019, the entire contents of which are hereby incorporated by reference.

BACKGROUND

The disclosure relates to an engine.

There are related-art engines that perform lean-burn using an air-fuel mixture with an air-fuel ratio leaner than a theoretical air-fuel ratio (that is, a lean air fuel mixture) in order to improve the fuel efficiency. However, when such engines perform lean-burn, it is difficult to ignite the air-fuel mixture.

Japanese Unexamined Patent Application Publication (JP-A) No. 6-93861 discloses an engine including a piston partition wall on the crown surface of a piston and a head partition wall surrounding the periphery of an ignition plug in a cylinder head. When the piston reaches the top dead center, the piston partition wall and the head partition wall are brought into close proximity with each other to form an auxiliary combustion chamber on their inner side.

An injector injects fuel directly into the auxiliary combustion chamber, thereby making the concentration of an air-fuel mixture inside the auxiliary combustion chamber higher than the concentration of an air-fuel mixture outside the auxiliary combustion chamber. The engine burns the air-fuel mixture in the auxiliary combustion chamber, thereby improving the ignitability in lean-burn.

SUMMARY

An aspect of the disclosure provides an engine. The includes a cylinder head, an ignition plug, a head partition wall, an injector, a cylinder block, a cylinder, a piston, and a piston partition wall. The ignition plug is disposed in the cylinder head. The head partition wall is disposed on the cylinder head to surround a periphery of the ignition plug. The injector is disposed in the cylinder head and having an injection hole exposed outside the head partition wall. The cylinder block is coupled to the cylinder head. The cylinder is formed in the cylinder block. The piston is disposed in the cylinder. The piston partition wall is disposed on a crown surface of the piston to face the head partition wall in a sliding direction of the piston. A height from the crown surface on a side closer to the injector is less than a height from the crown surface on a side farther from the injector.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

According to JP-A No. 6-93861, since the injector injects fuel directly into the auxiliary combustion chamber, the injection hole of the injector is disposed to be exposed within the head partition wall. However, in this case, both the injector and an ignition plug are densely disposed in the cylinder head. Therefore, it is difficult to mount the injector and the ignition plug in the cylinder head.

To address this issue, the injection hole of the injector may be disposed to be exposed outside the head partition wall such that fuel is injected from the outside of the auxiliary combustion chamber into the auxiliary combustion chamber. If the injection hole of the injector is disposed to be exposed outside the head partition wall, the injector and the ignition plug can easily be mounted in the cylinder head. However, in this case, it is difficult to introduce, into the auxiliary combustion chamber, the fuel to be supplied to the auxiliary combustion chamber, so that the ignitability in lean-burn is lowered.

It is desirable to provide an engine capable of improving the ignitability in lean-burn.

Figure 1:
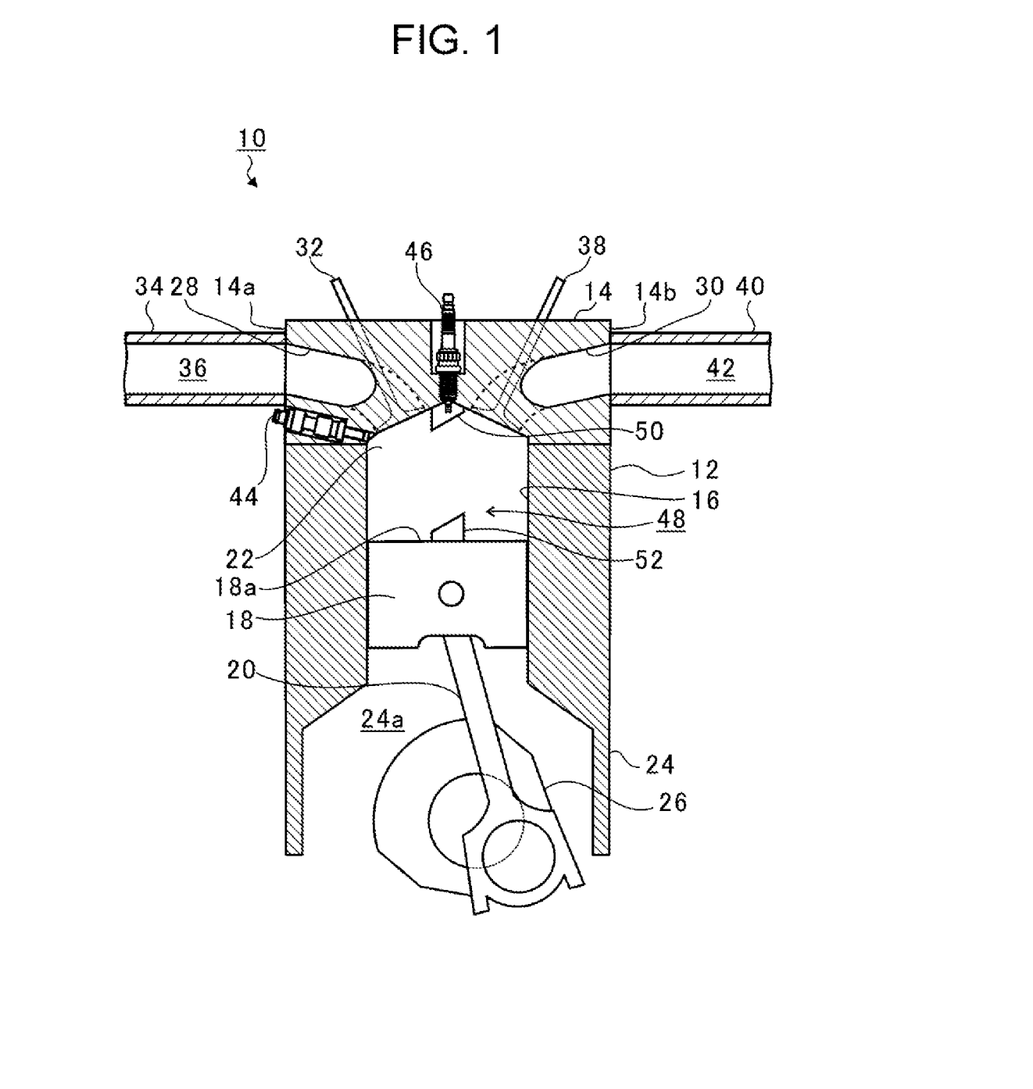
FIG. 1 is a schematic diagram illustrating the configuration of an engine.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 1 is a schematic diagram illustrating the configuration of an engine 10. As illustrated in FIG. 1, the engine 10 includes a cylinder block 12 and a cylinder head 14.

The cylinder block 12 has a cylinder bore 16. The cylinder bore 16 may have a single (one) cylinder bore 15 or may have a plurality of cylinder bores 15. A piston 18 is disposed in the cylinder bore 16. The piston 18 is slidably movable in the cylinder bore 16.

A connecting rod 20 is coupled to the piston 18. The cylinder head 14 is coupled to the cylinder block 12. A combustion chamber 22 is formed by the space enclosed by an inner wall surface of the cylinder head 14, an inner wall surface of the cylinder bore 16, and a crown surface 18a of the piston 18.

A crankcase 24 is permanently affixed to the cylinder block 12, on the side opposite to the side to which the cylinder head 14 is coupled. However, the crankcase 24 may be formed separately from the cylinder block 12.

The crankcase 24 has a crank chamber 24a therein. A crankshaft 26 is rotatably supported in the crank chamber 24a. The connecting rod 20 is coupled to the crankshaft 26. Accordingly, the piston 18 is coupled to the crankshaft 26 through the connecting rod 20.

The cylinder head 14 has an intake port 28 and an exhaust port 30. The intake port 28 and the exhaust port 30 communicate with the combustion chamber 22. The intake port 28 has one opening on the intake upstream side and two openings on the intake downstream side facing the combustion chamber 22. That is, the intake port 28 is configured such that a single passage splits into two passages in midstream from the intake upstream side toward the downstream side. The head of an intake valve 32 is disposed between the intake port 28 and the combustion chamber 22. The intake valve 32 moves in accordance with rotation of a camshaft (not illustrated) to open and close the communication of the intake port 28 with the combustion chamber 22.

An upstream end 14a where the intake port 28 is provided in the outer wall surface of the cylinder head 14 is coupled to an intake manifold 34. An intake passage 36 through which intake air flows is provided inside the intake manifold 34 and the intake port 28.

The exhaust port 30 has two openings on the exhaust upstream side facing the combustion chamber 22 and one opening on the exhaust downstream side. That is, the exhaust port 30 is configured such that two passages merge into a single passage in midstream from the exhaust upstream side toward the downstream side. The head of an exhaust valve 38 is disposed between the exhaust port 30 and the combustion chamber 22. The exhaust valve 38 moves in accordance with rotation of the camshaft (not illustrated) to open and close the communication of the exhaust port 30 with the combustion chamber 22.

A downstream end 14b where the exhaust port 30 is provided in the outer wall surface of the cylinder head 14 is coupled to an exhaust manifold 40. An exhaust passage 42 through which exhaust air flows is provided inside the exhaust port 30 and the exhaust manifold 40.

An injector 44 and an ignition plug 46 are disposed in the cylinder head 14 such that their tips are located within the combustion chamber 22. In the present embodiment, the injector 44 is located in the side face (located in the side) of the cylinder head 14.

For example, the injector 44 is disposed on the side opposite to the ignition plug 46 with respect to the intake port 28 (intake valve 32). However, the injector 44 may be disposed on the side opposite to the ignition plug 46 with respect to the exhaust port 30 (exhaust valve 38).

The injector 44 injects fuel to the intake air introduced into the combustion chamber 22 through the intake port 28. The ignition plug 46 ignites a mixture of the intake air and the fuel by discharging at a predetermined timing.

Upon ignition by the ignition plug 46, the mixture of the intake air and the fuel is burned. The burning causes the piston 18 to reciprocate within the cylinder bore 16. The reciprocal motion of the piston 18 is converted into rotational motion of the crankshaft 26 via the connecting rod 20.

To improve the fuel efficiency, the engine 10 performs lean-burn using an air-fuel mixture with an air-fuel ratio leaner than a theoretical air-fuel ratio (that is, a lean air fuel mixture). However, in the case of a related-art engine, it is difficult to ignite an air-fuel mixture when performing lean-burn.

To address this issue, the engine 10 of the present embodiment includes an auxiliary combustion chamber forming structure 48. The auxiliary combustion chamber forming structure 48 includes a head partition wall 50 and a piston partition wall 52.

The head partition wall 50 is provided on the cylinder head 14, and is disposed in the combustion chamber 22. The head partition wall 50 has a substantially cylindrical shape. The outer diameter (diameter) of the head partition wall 50 is less than the outer diameter (diameter) of the piston 18. The head partition wall 50 is disposed to surround the periphery of the ignition plug 46. The ignition plug 46 is disposed at the top (center) of the combustion chamber 22.

The piston partition wall 52 is provided on the crown surface 18a of the piston 18, and is disposed in the combustion chamber 22. The piston partition wall 52 has a substantially cylindrical shape. The outer diameter and the inner diameter of the piston partition wall 52 are respectively equal to the outer diameter and the inner diameter of the head partition wall 50.

The piston partition wall 52 is disposed at a position facing the head partition wall 50 in the sliding direction of the piston 18 (the central axis direction of the cylinder bore 16), on the crown surface 18a of the piston 18. The piston partition wall 52 is disposed at the center of the crown surface 18a of the piston 18. The central axis of the piston partition wall 52 substantially coincides with the central axis of the piston 18. The piston partition wall 52 moves together with the piston 18. The piston partition wall 52 moves in the direction toward the head partition wall 50 and the direction away from the head partition wall 50.

Figure 2:
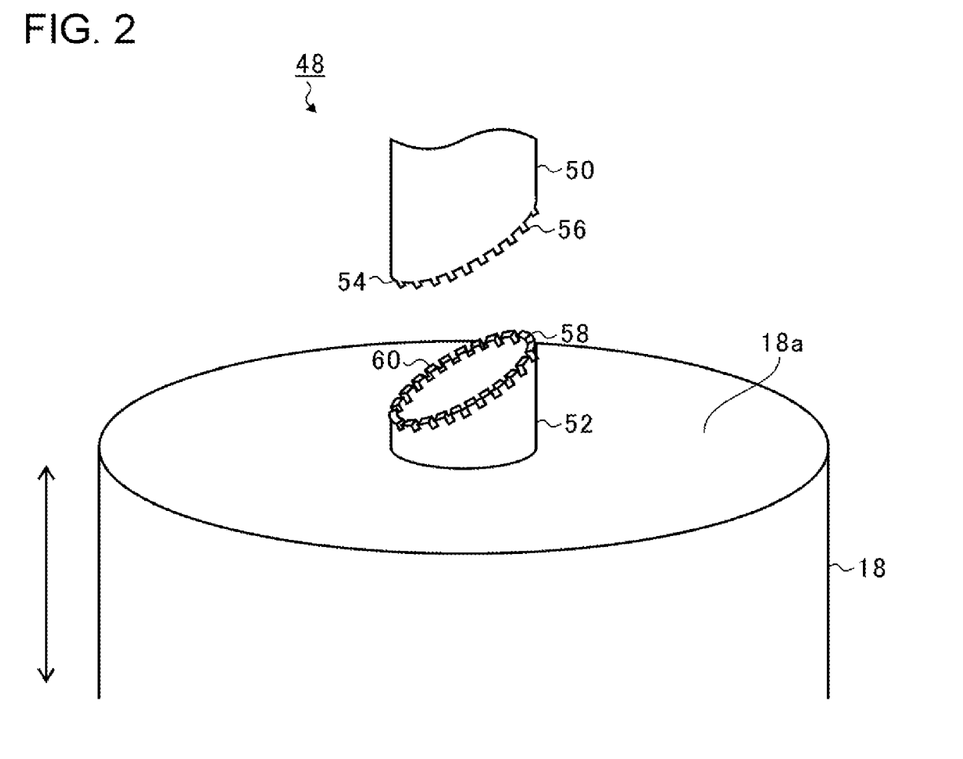
FIG. 2 is a schematic perspective view of an auxiliary combustion chamber forming structure according to an embodiment.

FIG. 2 is a schematic perspective view of the auxiliary combustion chamber forming structure 48 according to the present embodiment. As illustrated in FIG. 2, the head partition wall 50 has a tapered portion 54 at the end on the side facing the piston partition wall 52. The tapered portion 54 is inclined with respect to a plane (hereinafter referred to as a reference plane) orthogonal to the sliding direction (the direction of the double-headed arrow in FIG. 2) of the piston 18.

The tapered portion 54 has a plurality of projections 56 projecting toward the piston partition wall 52. The plurality of projections 56 are formed at regular intervals throughout the circumference of the head partition wall 50. However, the plurality of projections 56 may be formed at irregular intervals throughout the circumference of the head partition wall 50.

The piston partition wall 52 has a tapered portion 58 at the end on the side facing the head partition wall 50. The tapered portion 58 is inclined with respect to the reference plane. The inclination angle of the tapered portion 58 with respect to the reference plane is substantially equal to the inclination angle of the tapered portion 54 with respect to the reference plane. The tapered portion 58 is substantially parallel to the tapered portion 54.

The tapered portion 58 has a plurality of projections 60 projecting toward the head partition wall 50. The plurality of projections 60 are alternately arranged with the plurality of projections 56 in the sliding direction of the piston 18. The plurality of projections 60 are formed at equal intervals throughout the circumference of the piston partition wall 52. However, the plurality of projections 60 may be formed at irregular intervals throughout the circumference of the piston partition wall 52.

Figure 3:
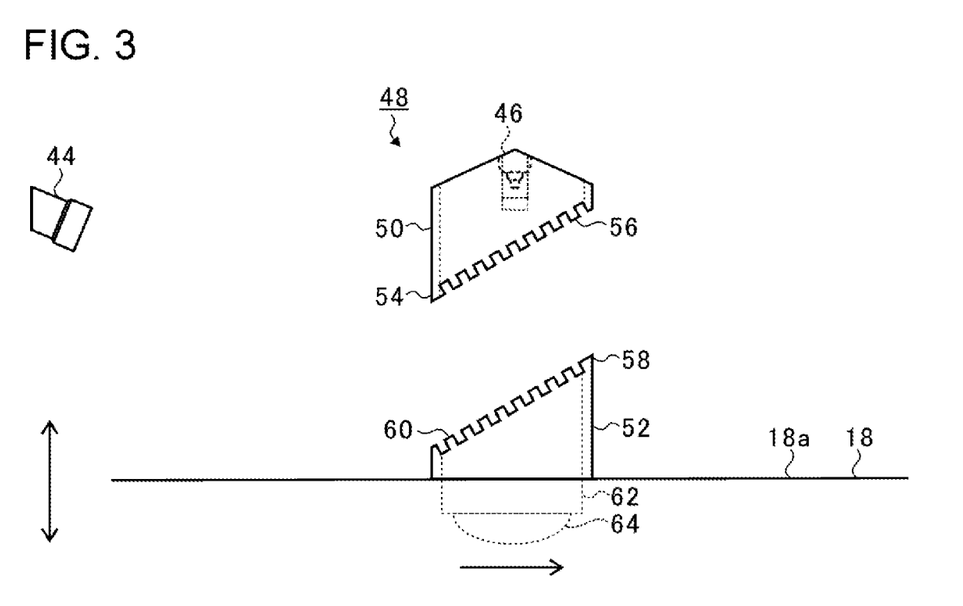
FIG. 3 is a schematic side view of the auxiliary combustion chamber forming structure according to the embodiment.
Figure 4:
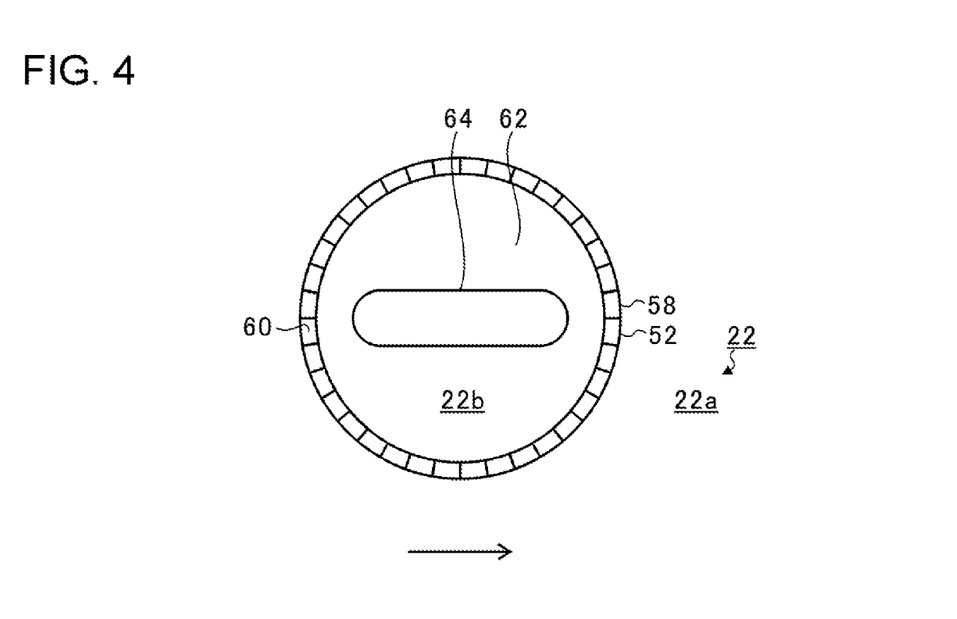
FIG. 4 is a schematic top view of a piston partition wall according to the embodiment.

FIG. 3 is a schematic side view of the auxiliary combustion chamber forming structure 48 according to the present embodiment. FIG. 4 is a schematic top view of the piston partition wall 52 according to the embodiment. As illustrated in FIG. 3, the head partition wall 50 surrounds the ignition plug 46 such that the ignition plug 46 is accommodated within the head partition wall 50. The injector 44 is disposed away from the ignition plug 46, and is located outside the head partition wall 50. The injection hole of the injector 44 is exposed outside the head partition wall 50, without being exposed inside the head partition wall 50.

The head partition wall 50 is configured such that the height from the inner wall surface of the cylinder head 14 (length in the sliding direction of the piston 18) varies along the injection direction of the injector 44 (the direction of the arrow in FIG. 3). In other words, the head partition wall 50 is configured such that the height from the cross-section orthogonal to the sliding direction of the piston 18 and passing through the ignition plug 46 varies along the injection direction of the injector 44. For example, the head partition wall 50 is configured such that the height on the upstream side in the injection direction of the injector 44 is greater than the height on the downstream side in the injection direction of the injector 44. In other words, the head partition wall 50 is configured such that the height on the side closer to the injector 44 is greater than the height on the side farther from the injector 44.

The height of the head partition wall 50 gradually decreases in the direction away from the injector 44 (toward the downstream side in the injection direction of the injector 44). That is, the head partition wall 50 is highest at the portion closest to the injector 44, and is lowest at the portion farthest from the injector 44.

The piston partition wall 52 is configured such that the height from the crown surface 18a of the piston 18 varies along the injection direction of the injector 44 (the arrow direction in FIG. 3). For example, the piston partition wall 52 is configured such that the height on the upstream side in the injection direction of the injector 44 is less than the height on the downstream side in the injection direction of the injector 44. In other words, the piston partition wall 52 is configured such that the height on the side closer to the injector 44 is less than the height on the side farther from the injector 44.

The height of the piston partition wall 52 gradually increases in the direction away from the injector 44 (toward the downstream side in the injection direction of the injector 44). That is, the piston partition wall 52 is lowest at the portion closest to the injector 44, and is highest at the portion farthest from the injector 44.

A recess 62 is formed within the piston partition wall 52. The recess 62 is recessed with respect to the crown surface 18a of the piston 18 in the direction away from the cylinder head 14 (head partition wall 50). The recess 62 has a groove 64 at its bottom. In this manner, the recess 62 and the groove 64 are formed within an inner wall surface of the piston partition wall 52.

As illustrated in FIG. 4, the groove 64 is formed at the center of the recess 62. Further, as illustrated in FIGS. 3 and 4, the groove 64 extends in the injection direction of the injector 44 (the direction of the arrow in FIGS. 3 and 4). As illustrated in FIG. 3, the cross-section of the groove 64 containing the central axis of the recess 62 (piston partition wall 52) and the injection direction of the injector 44 (the direction of the arrow in FIG. 3) has an arcuate (curved) shape. The groove 64 becomes deeper toward the center of the recess 62 (piston partition wall 52).

Figure 5:
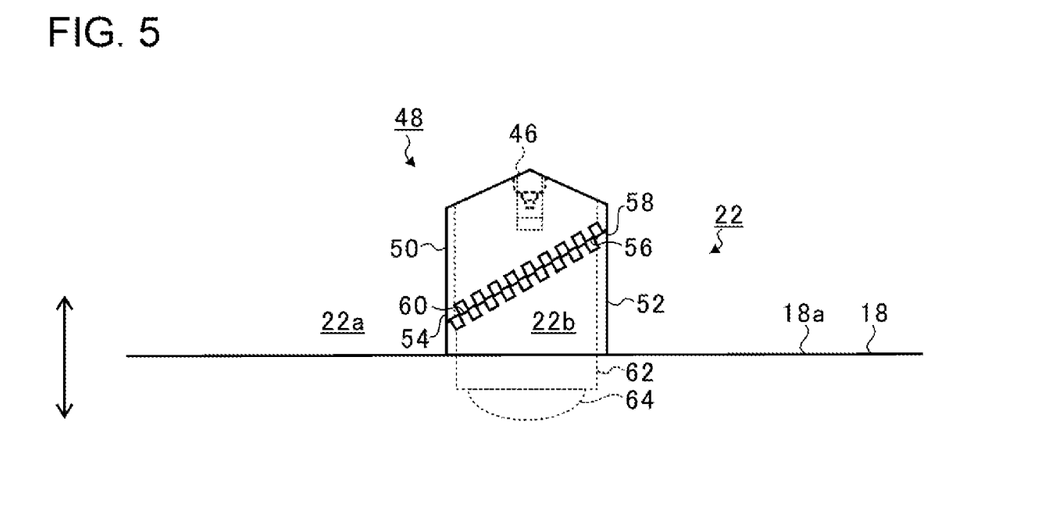
FIG. 5 illustrates a head partition wall and a piston partition wall in close proximity with each other.

FIG. 5 illustrates the head partition wall 50 and the piston partition wall 52 in close proximity with each other. As illustrated in FIG. 5, the head partition wall 50 and the piston partition wall 52 divide the combustion chamber 22 into two spaces when brought into close proximity with each other. The head partition wall 50 and the piston partition wall 52 divide the combustion chamber 22 into a primary combustion chamber 22a and an auxiliary combustion chamber 22b.

The primary combustion chamber 22a is formed by the space enclosed by the inner wall surface of the cylinder head 14 (see FIG. 1), the inner wall surface of the cylinder bore 16 (see FIG. 1), the crown surface 18a of the piston 18, and an outer surface of the head partition wall 50, and an outer surface of the piston partition wall 52.

The auxiliary combustion chamber 22b is formed by the space enclosed by an inner wall surface of the head partition wall 50 and an inner wall surface of the piston partition wall 52. The primary combustion chamber 22a is formed on the outer side with respect to the auxiliary combustion chamber 22b in the radial direction of the piston 18.

Figure 6:
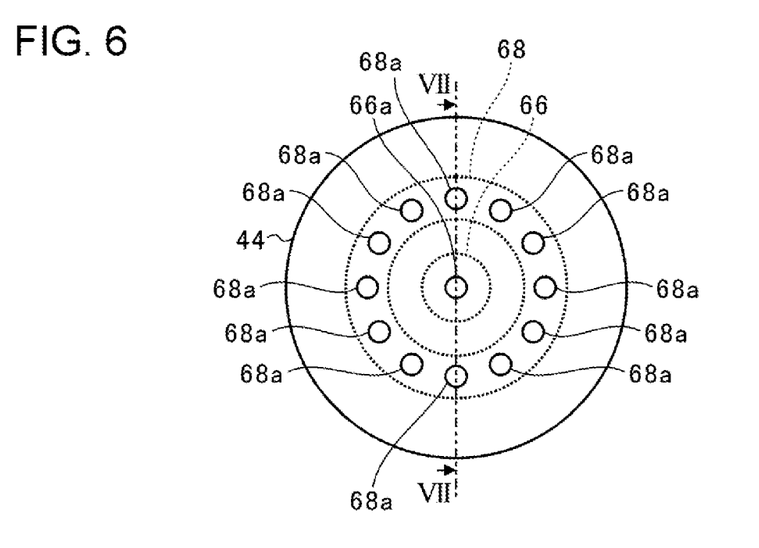
FIG. 6 illustrates an injector as viewed from the tip.
Figure 7:
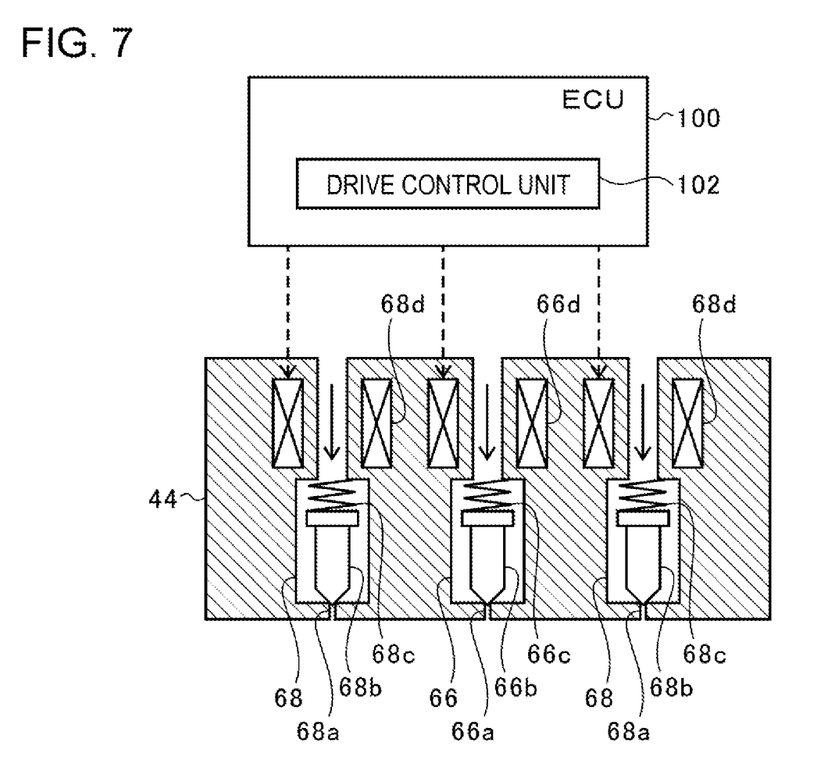
FIG. 7 is a schematic cross-sectional view taken along the line VII-VII of FIG. 6.

FIG. 6 illustrates the injector 44 as viewed from the tip. FIG. 7 is a schematic cross-sectional view taken along the line VII-VII of FIG. 6. In FIG. 7, the flow of fuel is indicated by the solid arrows, and the flow of signals is indicated by the broken arrows. As illustrated in FIG. 6, the injector 44 has a double pipe structure including an inner pipe 66 and an outer pipe 68.

The inner pipe 66 is disposed at the center of the injector 44, and the outer pipe 68 is disposed on the outer side with respect to the inner pipe 66 in the radial direction of the injector 44. The cross-section of the inner pipe 66 orthogonal to the central axis of the injector 44 has a substantially circular shape. The cross-section of the outer pipe 68 orthogonal to the central axis of the injector 44 has a substantially annular shape.

The injector 44 has a single injection hole 66a communicating with the inner pipe 66, at its tip. The injection hole 66a is located on the central axis of the injector 44. The injector 44 also has a plurality of (twelve in this embodiment) injection holes 68a communicating with the outer pipe 68, at its tip. The plurality of injection holes 68a are arranged at regular intervals in the circumferential direction of the injector 44. However, the plurality of injection holes 68a are arranged at irregular intervals in the circumferential direction of the injector 44.

As illustrated in FIG. 7, the inner pipe 66 is provided with an inner pipe needle 66b, an inner pipe spring 66c, and an inner pipe solenoid 66d. The inner pipe needle 66b closes the injection hole 66a of the inner pipe 66 when brought into close proximity (contact) with the injection hole 66a. The inner pipe needle 66b opens the injection hole 66a of the inner pipe 66 when moved away from the injection hole 66a.

The inner pipe spring 66c presses the inner pipe needle 66b in the direction toward the injection hole 66a. As will be described in detail below, when power is supplied, the inner pipe solenoid 66d suctions and moves the inner pipe needle 66b away from the injection hole 66a.

The outer pipe 68 is provided with outer pipe needles 68b, outer pipe springs 68c, and outer pipe solenoids 68d. Each outer pipe needle 68b closes the corresponding injection hole 68a when brought into close proximity (contact) with the injection hole 68a of the outer pipe 68. The outer pipe needle 68b opens the injection hole 68a of the outer pipe 68 when moved away from the injection hole 68a.

The outer pipe spring 68c presses the outer pipe needle 68b in the direction toward the injection hole 68a. As will be described in detail below, when power is supplied, the outer pipe solenoid 68d suctions and separates the outer pipe needle 68b away from the injection hole 68a.

The inner pipe solenoid 66d and the outer pipe solenoid 68d are electrically coupled to an ECU 100. The ECU 100 is a microcomputer including a central processing unit (CPU), a ROM storing programs and the like, and a RAM serving as a work area, and performs overall control on the engine 10 (see FIG. 1). In this embodiment, the ECU 100 serves as a drive control unit 102 when controlling the engine 10.

The drive control unit 102 determines the fuel injection amount and the fuel injection timing of the injector 44, based on signals output from various sensors provided on the engine 10 and the vehicle on which the engine 10 is mounted. The drive control unit 102 controls the inner pipe solenoid 66d and the outer pipe solenoid 68d, based on the fuel injection amount and the fuel injection timing.

The following describes the operations when the engine 10 performs lean-burn. During an intake stroke or a compression stroke of the engine 10, the drive control unit 102 supplies power to the outer pipe solenoids 68d to move the outer pipe needles 68b away from the plurality of injection holes 68a. When the outer pipe needles 68b are moved away from the plurality of injection holes 68a, the injector 44 injects fuel into the combustion chamber 22 through the plurality of injection holes 68a. In this step, the inner pipe needle 66b is brought into close proximity with the injection hole 66a to close the injection hole 66a.

Figure 8:
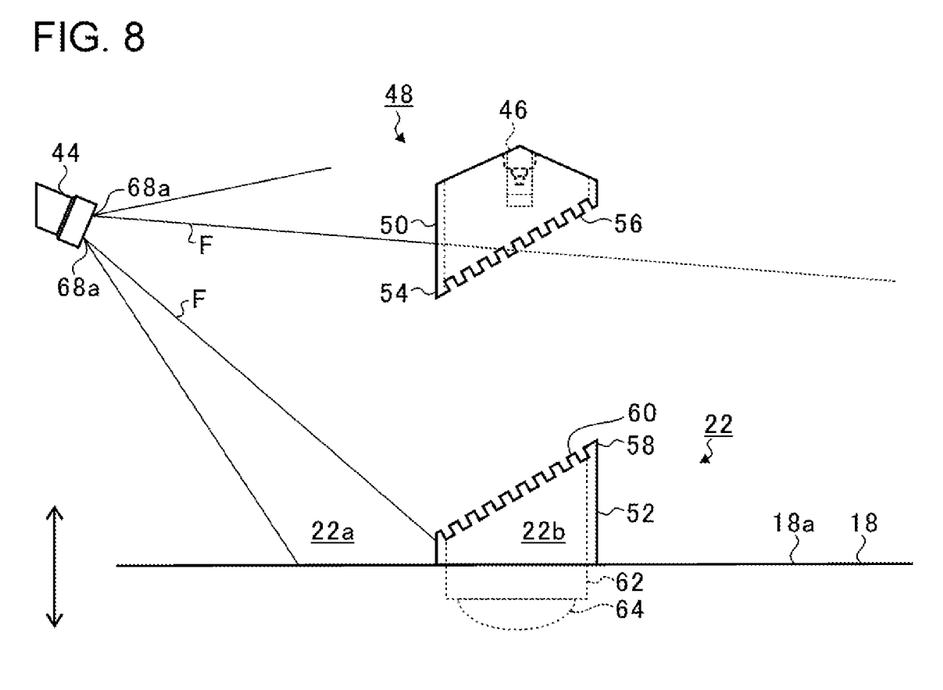
FIG. 8 illustrates injection of fuel from a plurality of injection holes.

FIG. 8 illustrates injection of fuel F from the plurality of injection holes 68a. As illustrated in FIG. 8, the plurality of injection holes 68a injects the fuel F toward the outer periphery of the crown surface 18a of the piston 18. The fuel F is supplied to the primary combustion chamber 22a outside the piston partition wall 52.

In this step, the ECU 100 performs control to close one of two intake ports 28 (see FIG. 1) communicating with the combustion chamber 22, thereby generating a swirl flow in the combustion chamber 22. For example, the ECU 100 performs control to open one of two intake valves 32 (see FIG. 1) disposed in the two intake ports 28 and close the other one, thereby generating a swirl flow in the combustion chamber 22.

As the swirl flow is generated in the combustion chamber 22, the fuel F injected from the plurality of injection holes 68a moves within the primary combustion chamber 22a in the circumferential direction of the piston 18. Therefore, the fuel F injected from the plurality of injection holes 68a is not easily introduced from the primary combustion chamber 22a located on the outer peripheral side of the piston 18 into the auxiliary combustion chamber 22b on the center side of the piston 18.

Immediately before the end of a compression stroke (that is, immediately before the start of a combustion stroke) of the engine 10, the drive control unit 102 supplies power to the inner pipe solenoid 66d, and moves the inner pipe needle 66b away from the injection hole 66a. When the inner pipe needle 66b is moved away from the injection hole 66a, the injector 44 injects the fuel F into the combustion chamber 22 through the injection hole 66a. In this step, the outer pipe needles 68b are brought into close proximity with the plurality of injection holes 68a to close the injection holes 68a.

Figure 9:
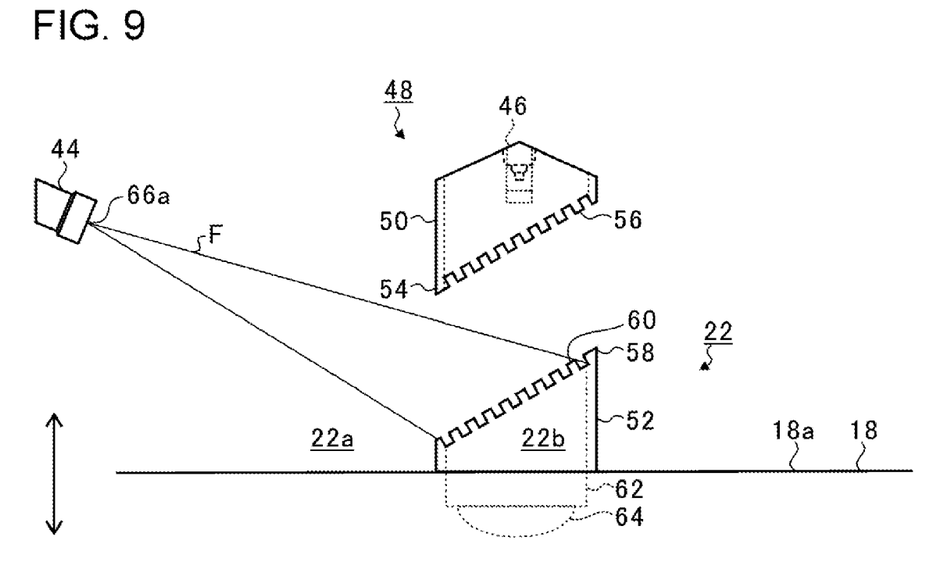
FIG. 9 illustrates injection of fuel from an injection hole.

FIG. 9 illustrates injection of the fuel F from the injection hole 66a. As illustrated in FIG. 9, the injection hole 66a injects the fuel F toward the center of the crown surface 18a of the piston 18. The fuel F is supplied to the auxiliary combustion chamber 22b inside the piston partition wall 52. In this step, the piston partition wall 52 is approaching the head partition wall 50, and the auxiliary combustion chamber 22b is being closed.

The drive control unit 102 makes the supply amount of the fuel F to be supplied to the primary combustion chamber 22a through the plurality of injection holes 68a substantially equal to the supply amount of the fuel F to be supplied to the auxiliary combustion chamber 22b through the injection hole 66a. However, since the capacity of the auxiliary combustion chamber 22b is less than the capacity of the primary combustion chamber 22a, the air-fuel ratio of the auxiliary combustion chamber 22b is less than the air-fuel ratio of the primary combustion chamber 22a. In other words, the air-fuel mixture in the auxiliary combustion chamber 22b is richer than the air-fuel mixture in the primary combustion chamber 22a. In this embodiment, the air-fuel ratio in the auxiliary combustion chamber 22b is made equal to the theoretical air-fuel ratio, and the air-fuel ratio in the primary combustion chamber 22a is made greater than the theoretical air-fuel ratio (that is, to have a lean air-fuel mixture).

Figure 10:
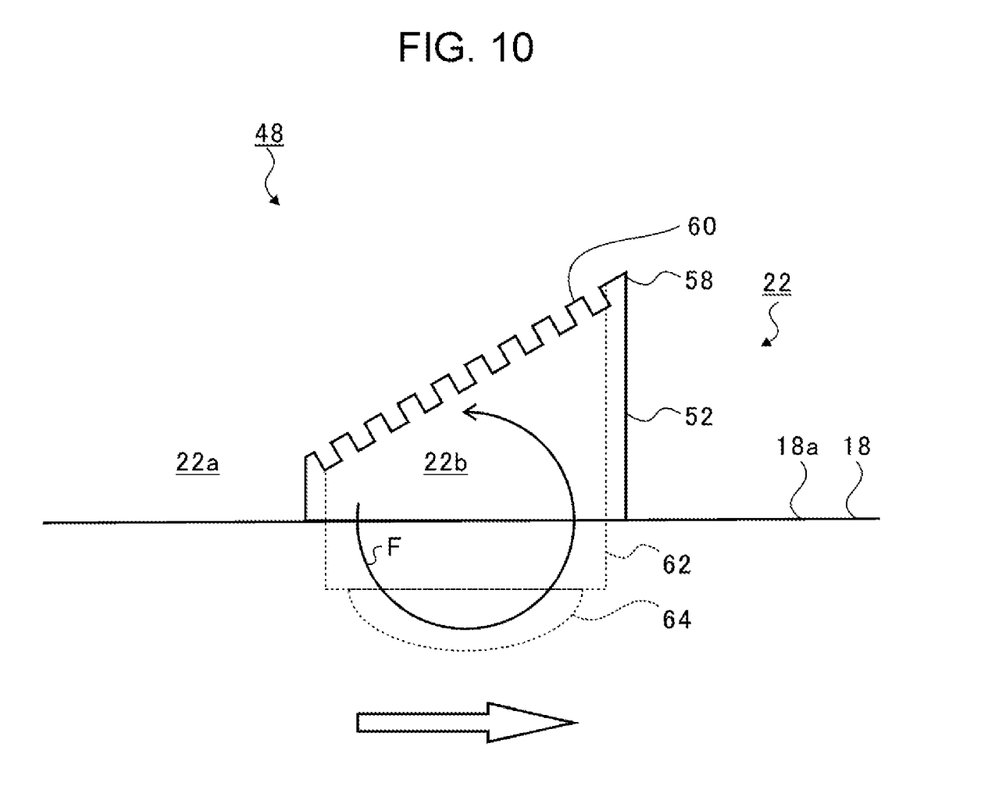
FIG. 10 illustrates fuel supplied to an auxiliary combustion chamber.

FIG. 10 illustrates the fuel F supplied to the auxiliary combustion chamber 22b. As illustrated in FIG. 10, the fuel F supplied into the auxiliary combustion chamber 22b flows into the recess 62, and reaches the groove 64 at the bottom of the recess 62. The fuel F having reached the groove 64 moves in the extending direction of the groove 64, that is, the injection direction (the direction of the white arrow in FIG. 10) of the injector 44 (see FIG. 9).

As mentioned above, the groove 64 is formed to have a circular cross-section. Accordingly, the fuel F moves along the arcuate shape of the groove 64 to form a tumble flow in the auxiliary combustion chamber 22b as illustrated in FIG. 10. In this manner, since the groove 64 is formed in the inner wall surface of the piston partition wall 52, a tumble flow can be generated in the auxiliary combustion chamber 22b.

In this step, as mentioned above, since a swirl flow is formed in the primary combustion chamber 22a, the flow in the primary combustion chamber 22a is not easily introduced into the auxiliary combustion chamber 22b, so that formation of a tumble flow in the auxiliary combustion chamber 22b is less likely to be inhibited. Moreover, since a swirl flow is formed in the primary combustion chamber 22a, the flow in the primary combustion chamber 22a is not easily introduced into the auxiliary combustion chamber 22b, and the rich air-fuel mixture in the auxiliary combustion chamber 22b and the lean air-fuel mixture in the primary combustion chamber 22a are less likely to be mixed with each other.

Figure 11:
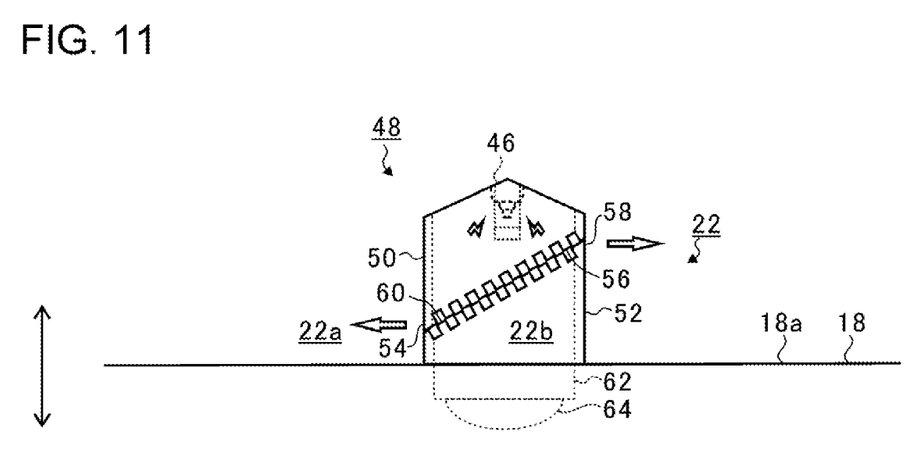
FIG. 11 illustrates ignition of fuel by an ignition plug.

FIG. 11 illustrates ignition of the fuel F by the ignition plug 46. As illustrated in FIG. 11, the head partition wall 50 and the piston partition wall 52 form therein the auxiliary combustion chamber 22b in a combustion stroke of the engine 10. The ignition plug 46 is ignited by the drive control unit 102 in a combustion stroke of the engine 10. When the ignition plug 46 is ignited, the fuel F (see FIG. 10) in the auxiliary combustion chamber 22b is ignited and burned. As mentioned above, since the air-fuel ratio of the auxiliary combustion chamber 22b is equal to the theoretical air-fuel ratio, the ignition plug 46 can easily ignite the fuel F in the auxiliary combustion chamber 22b.

The flame of the fuel F burned in the auxiliary combustion chamber 22b radially flows out from the auxiliary combustion chamber 22b to the primary combustion chamber 22a through the clearance between the plurality of projections 56 and 60, in the direction of the white arrow in FIG. 11. The flame flowed into the primary combustion chamber 22a burns the air-fuel mixture in the primary combustion chamber 22a.

In this step, since the flame of the fuel F burned in the auxiliary combustion chamber 22b is injected radially outwardly in jets from the center of the auxiliary combustion chamber 22b, misfire is less likely to occur to lean burn generated in the primary combustion chamber 22a.

Figure 12:
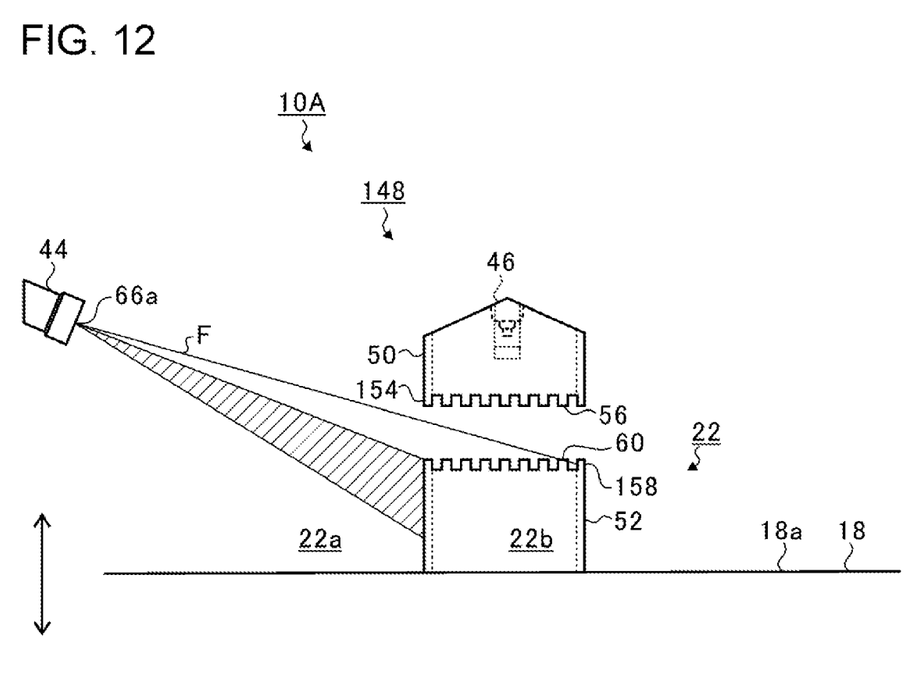
FIG. 12 is a schematic side view of an auxiliary combustion chamber forming structure according to a comparative example.

FIG. 12 is a schematic side view of an auxiliary combustion chamber forming structure 148 according to a comparative example. As illustrated in FIG. 12, an engine 10A of the comparative example includes the auxiliary combustion chamber forming structure 148. The auxiliary combustion chamber forming structure 148 of the comparative example is different in having parallel portions 154 and 158, in place of the tapered portions 54 and 58 of the auxiliary combustion chamber forming structure 48 of the above embodiment.

The parallel portions 154 and 158 are formed in parallel to the plane orthogonal to the sliding direction (the direction of the double-headed arrow in FIG. 12) of the piston 18. The injector 44 injects the fuel F from the injection hole 66a into the auxiliary combustion chamber 22b, immediately before the end of a compression stroke (that is, immediately before the start of a combustion stroke) of the engine 10A. In this step, a portion of the fuel F indicated by hatching in FIG. 12 reaches the outer wall surface of the piston partition wall 52 and is less likely to flow into the auxiliary combustion chamber 22b.

Therefore, even if the fuel F is injected from the injector 44 toward the auxiliary combustion chamber 22b, the air-fuel ratio in the auxiliary combustion chamber 22b is less likely to become equal to the theoretical air-fuel ratio, and the ignition plug 46 is less likely to ignite the fuel F in the auxiliary combustion chamber 22b. Consequently, it becomes difficult for the engine 10A of the comparative example to perform lean-burn.

Meanwhile, the auxiliary combustion chamber forming structure 48 of this embodiment includes the tapered portion 54 of the head partition wall 50 and the tapered portion 58 of the piston partition wall 52. Since the piston partition wall 52 has the tapered portion 58, the height from the crown surface 18a of the piston 18 on the side closer to the injector 44 is less than the height on the side farther from the injector 44.

Therefore, as illustrated in FIG. 9, the fuel F injected from the injection hole 66a of the injector 44 is less likely to be blocked by the outer wall surface of the piston partition wall 52, and easily flows into the piston partition wall 52. Consequently, the air-fuel ratio of the auxiliary combustion chamber 22b can be made equal to the theoretical air-fuel ratio, and the ignition plug 46 can easily ignite the fuel F in the auxiliary combustion chamber 22b. Accordingly, the engine 10 of this embodiment can easily perform lean-burn.

As described above, the engine 10 of this embodiment includes the auxiliary combustion chamber forming structure 48 having the tapered portions 54 and 58. With this provision, the ignitability in lean-burn in the engine 10 can be improved.

Further, the groove 64 is formed within the piston partition wall 52. With this provision, a tumble flow can be formed inside the auxiliary combustion chamber 22b. Accordingly, a rapid combustion is achieved, thereby improving the combustion stability in the auxiliary combustion chamber 22b.

While some embodiments of the present disclosure have been described with reference to the drawings, it should be understood that these embodiments do not limit the present disclosure. It is apparent to those skilled in the art that various changes and modifications may be made without departing from the scope of the present disclosure, and such changes and modifications fall within the technical scope of the present disclosure.

In this embodiment, the air-fuel ratio in the auxiliary combustion chamber 22b is equal to the theoretical air-fuel ratio. However, the present disclosure is not limited thereto. The air-fuel ratio in the auxiliary combustion chamber 22b may be different from the theoretical air-fuel ratio. For example, the air-fuel ratio in the auxiliary combustion chamber 22b may be set lower (richer) than the air-fuel ratio in the primary combustion chamber 22a, and be set higher (leaner) than the theoretical air-fuel ratio within the range where ignition is possible using a regular ignition plug.

In the above embodiment, the plurality of projections 56 of the head partition wall 50 are alternately arranged with the plurality of projections 60 of the piston partition wall 52 in the sliding direction of the piston 18. However, the present disclosure is not limited thereto. The plurality of projections 56 may be arranged to face the plurality of projections 60 in the sliding direction of the piston 18. In the above embodiment, both the plurality of projections 56 and the plurality of projections 60 are formed. However, the head partition wall 50 and the piston partition wall 52 may have a structure (clearance) for injecting in jets the flame of the fuel F burned in the auxiliary combustion chamber 22b, radially outwardly from the center of the auxiliary combustion chamber 22b. Accordingly, the head partition wall 50 and the piston partition wall 52 may not have both the plurality of projections 56 and the plurality of projections 60. For example, the head partition wall 50 may have the plurality of projections 56, while the piston partition wall 52 may not have the plurality of projections 60. Alternatively, the head partition wall 50 may not have the plurality of projections 56, while the piston partition wall 52 may have the plurality of projections 60. In other words, a clearance for communication between the auxiliary combustion chamber 22b and the primary combustion chamber 22a may be formed at at least a part in the circumferential direction between the head partition wall 50 and the piston partition wall 52 when the head partition wall 50 and the piston partition wall 52 are located closest to each other. That is, a clearance for discharging the flame of the fuel F burned in the auxiliary combustion chamber 22b may be formed at at least a part in the circumferential direction, between the head partition wall 50 and the piston partition wall 52.

In the above embodiment, the recess 62 is formed within the piston partition wall 52. However, the recess 62 may be omitted. Accordingly, there may be no recess 62 within the piston partition wall 52. In the above embodiment, the groove 64 is formed within the piston partition wall 52. However, the groove 64 may be omitted. Accordingly, there may be no groove 64 within the piston partition wall 52.

The invention claimed is:
1. An engine comprising:
a cylinder head;
an ignition plug disposed in the cylinder head;
a head partition wall disposed on the cylinder head to surround a periphery of the ignition plug;

an injector disposed in the cylinder head and having an injection hole exposed outside the head partition wall;

a cylinder block coupled to the cylinder head;

a cylinder formed in the cylinder block;

a piston disposed in the cylinder; and a piston partition wall disposed on a crown surface of the piston to face the head partition wall in a sliding direction of the piston, wherein the piston partition wall is configured in such a manner that a height from the crown surface on a side closer to the injector is less than a height from the crown surface on a side farther from the injector.

2. The engine according to claim 1, wherein a groove extending in an injection direction of the injector is formed within an inner wall surface of the piston partition wall.

3. The engine according to claim 1, wherein the head partition wall is configured in such a manner that a height from an inner wall surface of the cylinder head on a side closer to the injector is greater than a height from the inner wall surface of the cylinder head on a side farther from the injector.

4. The engine according to claim 2, wherein the head partition wall is configured in such a manner that a height from an inner wall surface of the cylinder head on a side closer to the injector is greater than a height from the inner wall surface of the cylinder head on a side farther from the injector.

5. The engine according to claim 1, wherein a clearance is formed at at least a part in a circumferential direction between the head partition wall and the piston partition wall when the head partition wall and the piston partition wall are located closest to each other.

6. The engine according to claim 2, wherein a clearance is formed at at least a part in a circumferential direction between the head partition wall and the piston partition wall when the head partition wall and the piston partition wall are located closest to each other.

7. The engine according to claim 3, wherein a clearance is formed at at least a part in a circumferential direction between the head partition wall and the piston partition wall when the head partition wall and the piston partition wall are located closest to each other.

8. The engine according to claim 4, wherein a clearance is formed at at least a part in a circumferential direction between the head partition wall and the piston partition wall when the head partition wall and the piston partition wall are located closest to each other.

* * * * *